United States Patent
Montanari

(10) Patent No.: US 12,441,629 B2
(45) Date of Patent: Oct. 14, 2025

(54) FLOW CONTROL FOR REVERSE OSMOSIS FILTER

(71) Applicant: Bellco SRL, Mirandola (IT)

(72) Inventor: Tommaso Montanari, Forli (IT)

(73) Assignee: Bellco SRL, Mirandola (IT)

(*) Notice: Subject to any disclaimer, the term of this patent is extended or adjusted under 35 U.S.C. 154(b) by 0 days.

(21) Appl. No.: 17/470,750

(22) Filed: Sep. 9, 2021

(65) Prior Publication Data

US 2023/0075109 A1  Mar. 9, 2023

(51) Int. Cl.
| | |
|---|---|
| *C02F 1/00* | (2023.01) |
| *B01D 61/02* | (2006.01) |
| *B01D 61/12* | (2006.01) |
| *B01D 61/54* | (2006.01) |
| *C02F 1/44* | (2023.01) |
| *C02F 1/469* | (2023.01) |

(52) U.S. Cl.
CPC ............ *C02F 1/008* (2013.01); *B01D 61/025* (2013.01); *B01D 61/12* (2013.01); *B01D 61/54* (2013.01); *C02F 1/441* (2013.01); *C02F 1/4695* (2013.01); *B01D 2311/06* (2013.01); *B01D 2311/14* (2013.01); *B01D 2311/243* (2013.01); *B01D 2311/2684* (2013.01); *B01D 2313/18* (2013.01); *B01D 2313/243* (2013.01); *C02F 2201/005* (2013.01); *C02F 2209/003* (2013.01); *C02F 2209/03* (2013.01); *C02F 2209/05* (2013.01); *C02F 2209/40* (2013.01)

(58) Field of Classification Search
CPC ................ C02F 1/008; C02F 2209/003; C02F 2201/005; C02F 2209/05; C02F 2209/40; B01D 61/025; B01D 61/12; B01D 61/54; B01D 2311/06; B01D 2311/14; B01D 2311/243; B01D 2311/2684; B01D 2313/18; B01D 2313/243
See application file for complete search history.

(56) References Cited

U.S. PATENT DOCUMENTS

| | | |
|---|---|---|
| 8,545,428 B2 | 10/2013 | Burbank et al. |
| 8,679,348 B2 | 3/2014 | Burbank |
| 9,388,059 B2 | 7/2016 | Burbank |

FOREIGN PATENT DOCUMENTS

| | | | | |
|---|---|---|---|---|
| CN | 105399255 A | * | 3/2016 | ............... C02F 9/00 |
| JP | 2011240234 A | * | 12/2011 | ............ B01D 61/06 |
| WO | WO-2020160655 A1 | * | 8/2020 | ............ B01D 61/06 |

OTHER PUBLICATIONS

Machine translation of CN105399255 A (Year: 2016).*
Machine translation of JP2011240234 A (Year: 2011).*

* cited by examiner

*Primary Examiner* — Jonathan M Peo

(57) ABSTRACT

The disclosure relates to systems, devices, and methods for flow control in a reverse osmosis filtration system, such as within a medical device. The systems, devices, and methods can respond to changes in permeate flow rate and solute concentration by adjusting feed water and concentrate water rates. Multiple feedback loops adjust parameters to meet water flow rate and purity requirements.

14 Claims, 5 Drawing Sheets

FLOW CONTROL FOR REVERSE OSMOSIS FILTER

FIELD

Systems, devices, and methods are provided for flow control in a filtration system, and particularly for a feedback system to control multiple flow rates associated with a reverse osmosis filter.

BACKGROUND

Many industrial and medical procedures require a continual supply of water to operate, which is often drawn from whatever local source is available. Filters are used to remove impurities and render the water suitable for its intended use. In a reverse osmosis filter, water is supplied to a semipermeable membrane. Filtered water (permeate) is forced through the membrane to be used, while the remainder (concentrate) is discharged. The purity of permeate produced by reverse osmosis can depend on the properties of the feed water, which may be highly variable. The existing approaches often fail to account for various factors such as the type and brand of a semipermeable membrane used in the filter, variations in the filtration process, the temperature of the feed water, and the pressure at which the water is forced against the semipermeable membrane. Conventional devices allow for additional stages of filtration to address this variability, as well as addressing significant fluctuations in the amount of filtered water produced by the filter. However, manual adjustments to the system are often made by the user to maintain these levels as close to optimum as possible.

A need therefore exists for a system that can automatically and simultaneously maintain both a desired flow rate of filtered water and a required level of water purity from a reverse osmosis filter. The need also exists for maintaining a flow rate of filtered water exiting a reverse osmosis filter. The need still further includes continuously monitoring and modifying a feed water and/or concentrate water flow rates to maintain a desired level of water purity. The need also includes monitoring and controlling an efficacy of a filtration process to control and minimize variability in a purity level of a resulting permeate.

SUMMARY OF THE INVENTION

The problem to be solved is to maintain a required flow rate of filtered water exiting a reverse osmosis filter. The solution is to use multiple feedback circuits to iteratively adjust both feed water and concentrate water flow rates entering and exiting the filter.

The first aspect of the invention relates to a system for water filtration. In any embodiment, the system can include a reverse osmosis filter having a semipermeable membrane; a feed line, a permeate line, and a concentrate line, each in fluid communication with the filter; a pump at the feed line pumping feed water into the filter; a flow sensor at the permeate line monitoring a flow rate of permeate water exiting the filter into the permeate line; a permeate sensor at the permeate line monitoring a property of the permeate water; an adjustable valve at the concentrate line regulating a flow rate of concentrate water exiting the filter into the concentrate line; a first feedback circuit configured to adjust the flow rate of feed water at the feed line based on comparing measurements from the flow sensor at the permeate line to one or more predetermined values for flow rate for the permeate water; and a second feedback circuit configured to control the adjustable valve to adjust the flow rate at the concentrate line based on comparing measurements from the permeate sensor to one or more predetermined values for the property of the permeate water monitored by the permeate sensor.

In any embodiment, the permeate sensor can be a conductivity sensor measuring the conductivity of the permeate water exiting the filter into the permeate line, the conductivity of the permeate water varying according to the amount of solute present in the permeate water after filtration.

In any embodiment, the first feedback circuit can set a desired pressure for the feed water at the feed line. The system can further include a pressure sensor at the supply line downstream from the pump, the pressure sensor monitoring a pressure of the feed water; and a third feedback circuit configured to adjust the operation speed of the pump based on comparing measurements from the pressure sensor to the desired pressure set by the first feedback circuit.

In any embodiment, the system can further include an adjustable valve at the feed line, the first feedback circuit controlling the adjustable valve at the feed line to adjust the flow rate of feed water.

In any embodiment, the system can further include a microprocessor in electrical communication with the flow sensor at the permeate line, the permeate sensor at the permeate line, and the adjustable valve at the concentrate line, the microprocessor including both the first feedback circuit and the second feedback circuit.

In any embodiment, the system can further include an electrodeionization filter downstream from the reverse osmosis filter.

In any embodiment, the one or more predetermined values for the flow rate of the permeate water can be based on a required water flow rate for the electrodeionization filter.

In any embodiment, the one or more predetermined values for the property of the permeate water can be based on conditions for operation of the electrodeionization filter.

In any embodiment, the configuration of the first and second feedback circuits can be interrelated such that the first feedback circuit makes an adjustment based on an adjustment made by the second feedback circuit, and the second feedback circuit makes an adjustment based on the first feedback circuit.

The features disclosed as being part of the first aspect of the invention can be in the first aspect of the invention, either alone or in combination, or follow any arrangement or permutation of any one or more of the described elements. Similarly, any features disclosed as being part of the first aspect of the invention can be in the second aspect of the invention described below, either alone or in combination, or follow any arrangement or permutation of any one or more of the described elements.

The second aspect of the invention relates to a method for water filtration. In any embodiment, the method can include the steps of: during operation of a reverse osmosis filter, adjusting a flow rate of feed water supplied to the filter based on measurements for a flow rate of permeate exiting the filter; and during the operation of the filter, adjusting a flow rate of concentrate water discharged from the filter based on measurements of solute concentration of the permeate exiting the filter.

In any embodiment, the method further includes the step of monitoring the flow rate of permeate water exiting the filter throughout the operation, the step of adjusting the flow rate of feed water occurring repeatedly in response to the monitored rate deviating from a predetermined range.

In any embodiment, the method further includes the step of monitoring the solute concentration of the permeate water throughout the operation, the step of adjusting the flow rate of concentrate water occurring repeatedly in response to the monitored concentration deviating from a predetermined range.

In any embodiment, the step of adjusting the flow rate of concentrate water discharged from the filter can occur in response to the step of adjusting the flow rate of feed water supplied to the filter.

In any embodiment, the method further includes the step of monitoring the solute concentration of the permeate water throughout the operation, the step of adjusting the flow rate of concentrate water occurring repeatedly in response to the monitored concentration deviating from a predetermined range.

In any embodiment, the step of adjusting the flow rate of feed water supplied to the filter can occur in response to the step of adjusting the flow rate of concentrate water discharged from the filter.

In any embodiment, adjusting the flow rate of water supplied to the filter can include setting a desired pressure for the feed water. The method can further include the step of, during the operation of the filter, adjusting the operation of a pump supplying the feed water based on monitoring the pressure of the feed water and comparing it to the desired pressure.

In any embodiment, the method further includes the steps of: monitoring the flow rate of permeate water exiting the filter throughout the operation, the step setting a desired pressure for the feed water occurring repeatedly in response to the monitored rate deviating from a predetermined range; and monitoring the pressure of the feed water throughout the operation, the step of adjusting the operation of the pump occurring repeatedly in response to the monitored pressure of the feed water deviating from the most recently set desired pressure for the feed water.

In any embodiment, adjusting the flow rate of feed water supplied to the filter can include adjusting a valve on a feed line in fluid communication with the filter.

In any embodiment, adjusting the flow rate of concentrate water discharged from the filter can include adjusting a valve on a concentrate line in fluid communication with the filter.

In any embodiment, monitoring the solute concentration of the permeate water can include repeatedly measuring a conductivity level of the permeate exiting the filter.

The features disclosed as being part of the second aspect of the invention can be in the second aspect of the invention, either alone or in combination, or follow any arrangement or permutation of any one or more of the described elements. Similarly, any features disclosed as being part of the second aspect of the invention can be in the first, aspect of the invention described above, either alone or in combination, or follow any arrangement or permutation of any one or more of the described elements.

DETAILED DESCRIPTION

Figure 1:
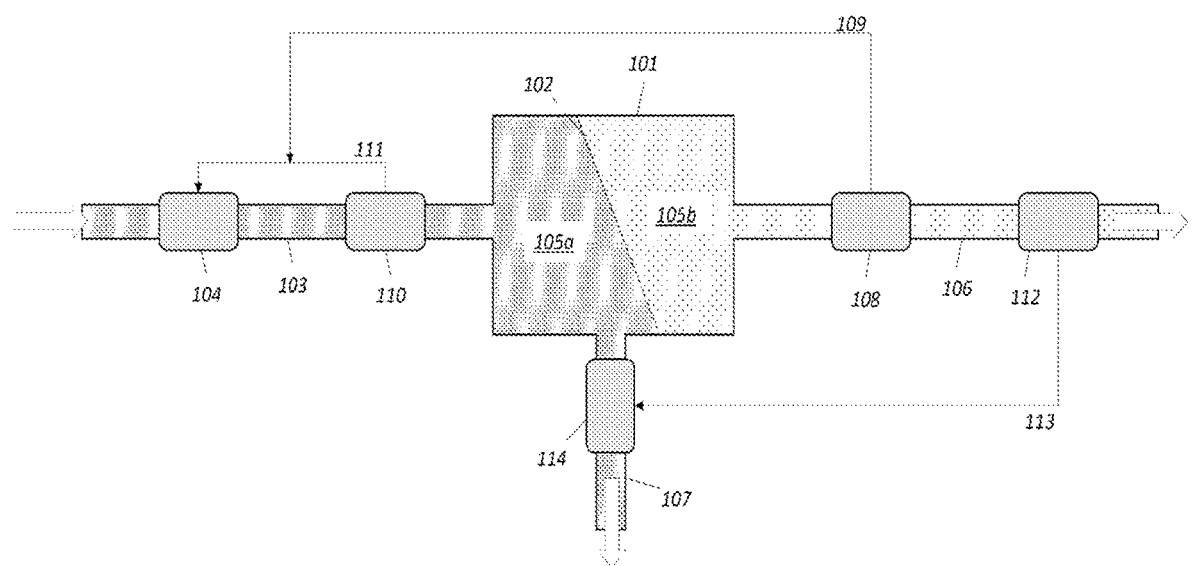
FIG. 1 is a cross-sectional view of a portion of a water filtration system.

Unless defined otherwise, all technical and scientific terms used have the same meaning as commonly understood by one of ordinary skill in the art.

The articles "a" and "an" are used to refer to one to over one (i.e., to at least one) of the grammatical object of the article. For example, "an element" means one element or over one element.

An "adjustable valve" is a component disposed within a fluid path that can vary in size to partially obstruct a flow line to regulate the fluid flow rate along that line.

To "associate" means to identify one piece of information as related to a second piece of information.

To "calculate" means to determine a particular value by applying one or more equations and/or functions to one or more values.

A "circuit" is a component of a system that is in electrical communication with other components. A circuit sends, receives, and/or processes electronic data, instructions, and/ or information.

The terms "communication," "communicate," "communicating," and the like can refer to the ability to transmit electronic data, instructions, information wirelessly, via direct electrical connection, or any other electrical transmission means between one or more components.

The term "compare" means to determine whether two files or data are the same or different.

The term "comprising" includes, but is not limited to, whatever follows the word "comprising." Use of the term indicates the listed elements are required or mandatory but that other elements are optional and may be present.

"Concentrate" or "concentrate water" is water that passes through a reverse osmosis filter without passing through the membrane of the filter. When permeate water passes through the filter, the remaining concentrate water has a higher solute concentration than the feed water. The concentrate water exits the filter at the "concentrate line."

"Conductivity" refers to electrical conductivity, the ability of a fluid to conduct electricity. Conductivity is a property of water that varies according to which solutes are dissolved in the water and the concentration of each solute.

A "conductivity sensor" determines the conductivity of a fluid by measuring the current running through the fluid at a known voltage.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts, or features that do not affect the basic operation of the apparatus, structure or method described.

A "controller" or "driver" is a device capable of sending signals to manage the operation of one or more devices in a system. A single component, such as a processor, circuit, or other device, may be a controller or driver for more than one component of a system.

The term "device," as used herein, refers to any device that can authenticate a user or USB authentication device.

The term "determining" or to "determine" refers to ascertaining a particular state of a component or system.

The term "device" is to be interpreted in the broadest sense and can include anything made for a particular purpose; a contrivance of any type, particularly a mechanical or electrical component or hardware. Some examples of devices can include a medical device such as a dialysis machine, laptop, computer, computer peripherals of any type, computer terminals, portable devices, smart phones, and smart watches.

A "dialysis system" is a collection of medical devices used to provide dialysis treatment to one or more patients.

To "discharge" is to exit from a device or component. Fluid beginning at a device or component and traveling downstream is discharged from that component.

"Electrodeionization" is a filtration process that exposes fluid to charged components adjacent to exchange membranes to draw dissolved ions out of the fluid. An "electrodeionization filter" treats water by electrodeionization.

The term "execute" means to perform a step or series of steps.

"Feed water" is the water supplied to a filter to undergo filtration. The feed water enters at a "feed line."

A "feedback circuit" automatically and repeatedly adjusts a controlled system parameter when a monitored system parameter deviates from an acceptable range.

A "filter" is a device that separates a fluid such as water from solute. The operation of a filter is "filtration."

The terms "flowing" or to "flow" refer to the movement of a fluid such as water.

The term "fluid communication" means that two chambers are connected, either directly or indirectly, with or without intervening elements such as valves, membranes, stoppers, or the like, so that fluid flows from one chamber into another. Chambers are in "fluid communication" whether or not the fluid flows in both directions.

A "fluid flow path" refers to a pathway through which a fluid can travel.

A component is "intrusive" if it is positioned within a chamber for holding or transporting liquid such that it will come in physical contact with the liquid.

To "measure" is to determine a quantifiable property of a component or system via a sensor.

A "microprocessor" is single integrated circuit having both data processing logic and control built into a unified component.

A system or method is "non-intrusive" if it contains no intrusive components—that is, if every component of the system or used to implement the method is positioned outside of the chambers where liquid is transported and stored so that none of the components come in physical contact with the liquid.

"Permeate" or "permeate water" is water that has passed through the membrane of a reverse osmosis filter and has a lower concentration of solutes than the feed water. The permeate water exits the filter at the "permeate line."

The term "programmed" can mean a series of instructions that cause a device or system to perform certain steps.

A "property" of a fluid such as water is a variable quantity that can be measured by sensors included in the system and that varies according to the solute concentration of the fluid.

A "pump" is a component that applies mechanical force to move fluid such as water.

A step or process occurs "repeatedly" when a circuit is configured to execute the step or process multiple times that a condition is met, even if the step or process has successfully executed before. A feedback circuit executes an adjustment step "repeatedly" even if, as described herein, there is a delay after execution of the step during which the feedback circuit will not immediately execute the step again.

"Reverse osmosis" is a method for filtering solutes from liquid water by passing the water through a semipermeable membrane.

A "semipermeable membrane" is a barrier that selectively permeable to some molecules but not others. Semipermeable membranes that are permeable to water molecules, but not to molecules of solute dissolved in water, are used in reverse osmosis.

A "sensor" is a device configured to determine a particular state of a component or system.

A "solute" is a substance dissolved in a fluid such as water. "Solute concentration" refers to the quantity of solute per unit volume, either in total or with respect to a particular particle or material dissolved in the fluid.

The term "upstream" refers to a position of a first component in a flow path relative to a second component wherein fluid will pass by the first component prior to the second component during normal operation. The first component can be said to be "upstream" of the second component, while the second component is "downstream" of the first component.

"Water" refers to liquid water with whatever solutes it contains, both before and after filtration. Water is a fluid, flows in a fluid flow path, and has measurable properties such as pressure and conductivity.

Reverse Osmosis Filter

FIG. 1 shows a portion of a flow path including a reverse osmosis filter 101. The filter 101 is characterized by a semipermeable membrane 102 that provides the mechanical basis for the filtration mechanism. The semipermeable membrane 102 may comprise one or multiple layers of porous or fibrous material and may be geometrically disposed in different configurations as known in reverse osmosis filtration. The properties of the membrane 102 may depend on the specifics of the feed water as well as the use for which the resulting filtered water will be applied.

Feed water enters the filter 101 from the feed line 103. The feed line 103 may be connected to any appropriate water source, such as a water tap or storage tank. In some embodiments, concentrate water discharged from the filter 101 or other filtration processes may be at least partially reused as feed water. A pump 104 propels feed water from the feed line 103 into the filter 101.

Due to the pressure from the pump 104, the water on the first side 105a of the membrane 102 is under a higher pressure than the water on the second side 105b of the membrane 102. This pressure differential between the first side 105a and second side 105b causes water to cross the semipermeable membrane 102 despite the concentration of solute on the second side 105b being lower than the solute concentration on the first side 105a.

Water that crosses the membrane 102 is permeate water and exits the filter 101 at the permeate line 106. The rest of the water that does not cross the membrane 102 is concentrate water and exits the filter 101 at the concentrate line 107.

The system may require a particular flow rate of water meeting a particular filtration standard to exit the permeate line 106 during operation. For example, a deionization module may be immediately downstream from the filter 101 and may require a fixed flow rate of permeate water. The deionization module may also be limited to treating permeate water that has been purified to a predefined extent.

FIG. 1 illustrates sensors and feedback circuits to allow for automated adjustments to meet the required parameters.

Permeate water fluid flow is positively correlated with feed water pressure, although not necessarily linearly. Within acceptable parameters for the device, increasing the feed water pressure will result in an increase in the permeate water fluid flow, and decreasing the feed water pressure will result in a decrease in the permeate water fluid flow. A feedback circuit is shown and explained linking these parameters.

A fluid flow sensor 108 at the permeate line 106 monitors the rate at which permeate water exits the filter 101 at the permeate line 106. A feedback circuit 109 compares this fluid flow to the required permeate flow rate and, when needed, adjusts a required feed line pressure value to match. The feedback circuit 109 may incorporate, for example, a proportional-integral-derivative ("PID") controller or any other appropriate feedback control system.

In some embodiments, the required feed line pressure value supplied by the feedback circuit 109 is then used as the target value for another feedback circuit 111. A pressure sensor 110 monitors the pressure at the feed line 103 downstream of the pump 104. The feed water pressure is positively correlated with the pump speed, although not necessarily linearly. Therefore, within acceptable parameters for the device, increasing the operation speed of the pump 104 can increase the pressure at the feed line 103. Therefore, the feedback circuit 111 can compare the monitored pressure from the sensor 110 to the required pressure value received from the feedback circuit 109 and, when needed, adjusts the speed of the pump 104 to match.

Because the output of feedback circuit 109 is used for the input of feedback circuit 111, they are together understood to form a nested feedback loop structure. In some embodiments, feedback circuit 109 and feedback circuit 111 may be implemented jointly by a single device or component of the system, such as a single processor, or within a single module of digital logic. To avoid instability and/or overcorrection, feedback circuit 109 or feedback circuit 111 or both circuits may introduce a delay after an adjustment is made to allow the system parameters to change before an adjustment is made again. Allowing for a range of values (for example, allowing for feed water to be between 60 and 70 psi when the required value is set to 65 psi) can also avoid instability and/or overcorrection. Because instability in the feed line pressure may cause failure of the entire filter 101, the feedback circuit 111 may operate at a much higher frequency than the other feedback circuits described herein. In one embodiment, a feedback loop associated with the feedback circuit 111 may execute at approximately 10 Hz, multiple times per second, while the loop associated with the feedback circuit 109 may execute at approximately 0.1 Hz, once every 10 seconds. Each semipermeable membrane can operate in a specified pressure working range as determined by one of ordinary skill. Each of the feedback circuit 111, feedback circuit 109, and feedback circuit 113 can act in a closed loop. The proportional-integral-derivative ("PID") controller or any other appropriate feedback control system can be operated with for example, a non-limiting frequency in the range of about 20 Hz. The initial feed pressure can be determined by any suitable controller.

In one non-limiting embodiment, the feedback circuit 111 can operate as a core circuit because a temporary overshooting or instability of the feedback circuit 111 could cause a failure of the entire system while temporary instabilities feedback circuit 109 and/or feedback circuit 113 could be tolerated by the system. In other embodiments, once an adjustment to the required feed line pressure is made by feedback circuit 109, the feedback circuit 109 may be temporarily unable to make further adjustments until the pressure monitored at pressure sensor 110 has stabilized. This provides another mechanism for the inner feedback circuit 111 to have time to act without premature interference by the outer feedback circuit 109. In other embodiments, the difference in frequency between the two circuits and/or the use of a set time delay after adjustment by the feedback circuit 109 may be sufficient without introducing this further condition.

Figure 5:
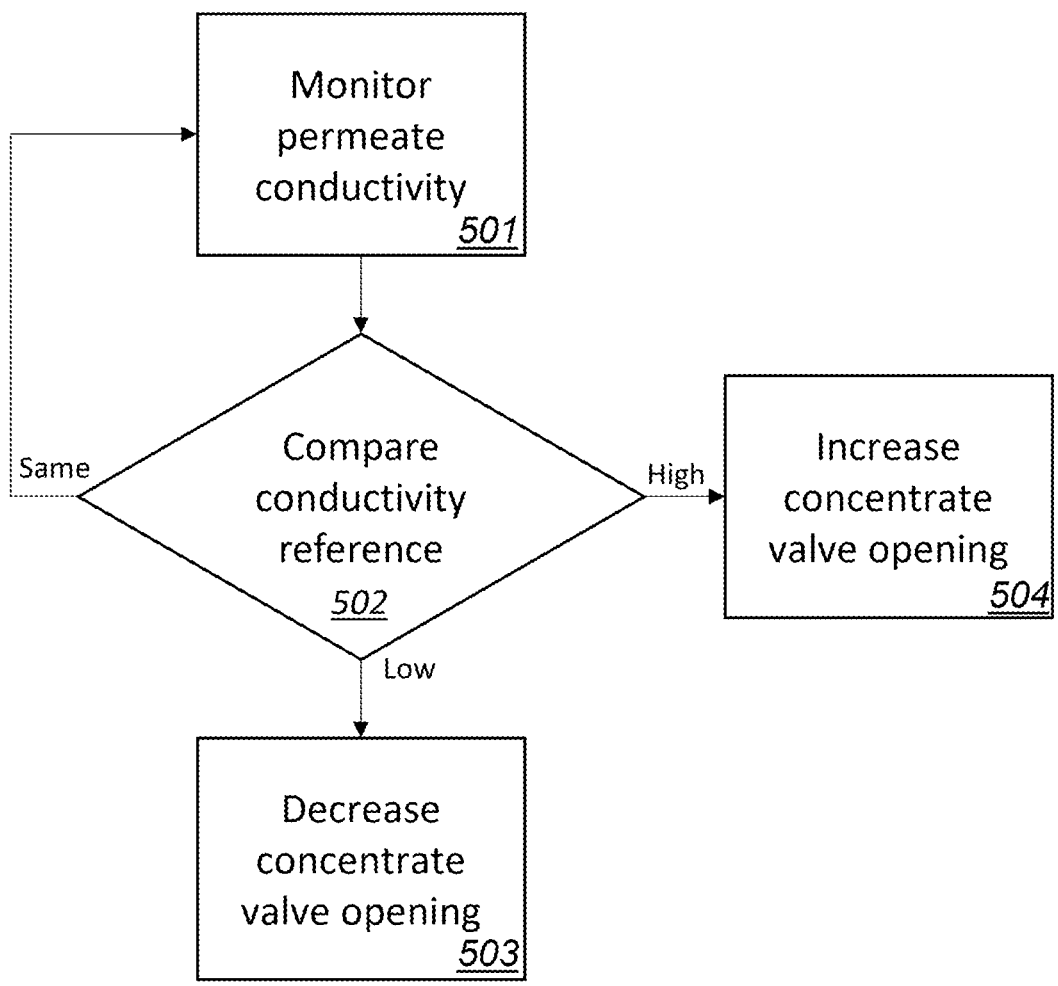
FIG. 5 is a flow chart showing steps for adjusting parameters within a filtration system.

If feedback circuit 111 is stable, the feedback circuit 109 can come into play. Differently from feedback circuit 111, the feedback circuit 109 could be an event-based control as described in FIG. 3 to compare a flow reference in step 302 or step 306 and increase or decrease a reference feed pressure. In certain embodiments, the feedback circuit 111 can incorporate feedback circuit 109 for functioning or, in other words, feedback circuit 111 cannot operate without feedback circuit 109 functioning. Once stability in terms of pressure and flow has been reached through feedback circuit 111 and feedback circuit 109, feedback circuit 113 comes into play. As described for feedback circuit 109, also feedback circuit 113 functioning resides on functioning of feedback circuit 111. Feedback circuit 113 can operate as shown in FIG. 5 to increase a concentrate value opening in step 504 or decrease a concentrate valve opening in step 503. To ensure correct functioning, the closed feedback circuit 111 can be operated at this time. If valve 114 is slightly opened with pump 104 running at a fixed speed, the pressure sensor 110 can detect a decrease in feed pressure thus impacting flow at a permeate line.

The solute concentration on the permeate side 105$b$ of the remote osmosis filter 101 will depend on, among other factors, the relative flow rates of permeate water at the permeate line 106 and concentrate water at the concentrate line 107. For a given flow rate for the feed water, a higher flow rate for concentrate water will result in better purification—that is, in lower solute concentration for the permeate. Permeate solute concentration correlates negatively with concentrate water flow rate.

A permeate sensor 112 measures a property of the permeate water that changes according to its solute concentration. For example, the conductivity of water depends on the concentration of ions dissolved in the water. Therefore, in some embodiments, the sensor 112 may be a conductivity sensor. A feedback circuit 113 compares the conductivity of the permeate water in the permeate line 106 as measured by the permeate sensor 112 and, when needed, adjusts the concentrate flow by partially opening or closing an adjustable valve 114 at the concentrate line 107. The feedback circuit 113 may incorporate a PID controller or other known algorithmic feedback framework in order to process and respond to the monitored data.

The feedback circuit 113 can operate at a slower frequency, such as approximately 0.1 in some embodiments. As described above with respect to the outer feedback circuit 109, the feedback circuit 113 may wait after making an adjustment to the valve 114 before making any further adjustment. This wait may take the form of a timed delay. Alternatively, the feedback circuit 113 may wait until the measurements taken by the fluid flow sensor 108 show that the flow through the permeate line has stabilized and no further adjustments are immediately needed by the feedback circuit 109 or the feedback circuit 111.

Figure 2:
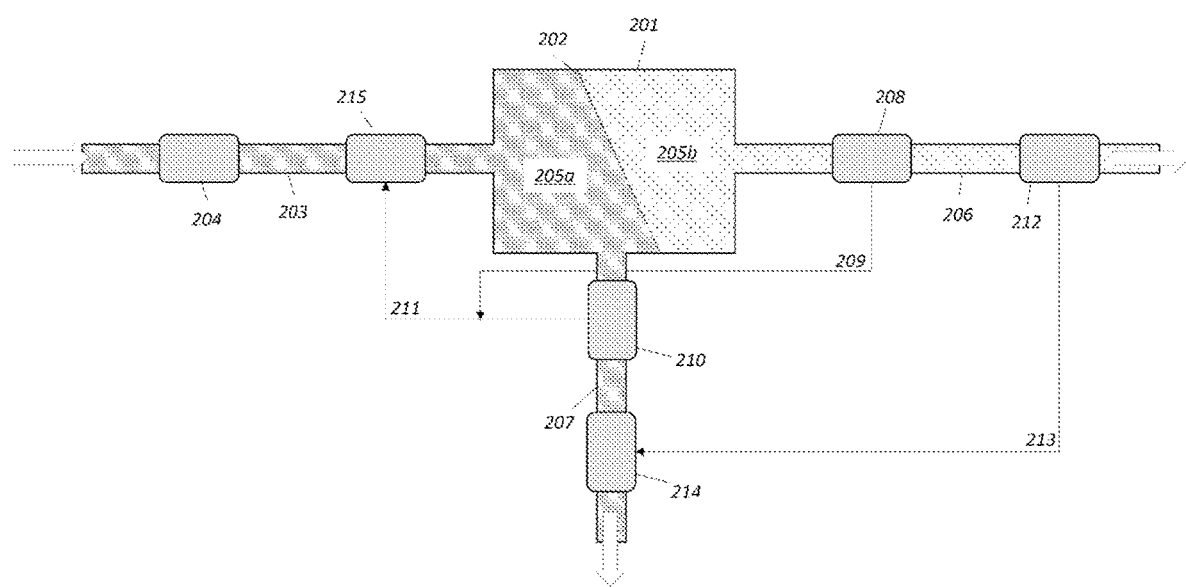
FIG. 2 is a cross-sectional view of a portion of a water filtration system

FIG. 2 shows a portion of a flow path including a reverse osmosis filter 201, characterized by a semipermeable membrane 202 analogous to what is described above with respect to FIG. 1.

Feed water enters the filter 201 from the feed line 203, propelled by a pump 204. The pressure from the pump 204 causes the first side 205a of the membrane 202 to have a higher pressure than the second side 205b, just as described with respect to FIG. 1. A permeate line 206 and concentrate line 207 provide the exit bases for the water.

As above, the permeate line 206 includes a flow rate sensor 208 and a permeate sensor 212 that may be, for example, a conductivity sensor. Differing from FIG. 1, FIG. 2 shows an embodiment in which a pressure sensor 210 is on the concentrate line 207 rather than the feed line 203. Concentrate water pressure correlates directly with permeate water flow just as feed water pressure does. Therefore, feedback circuit 209 monitors the permeate water flow and, when needed, adjusts the required water pressure for the concentrate line 207 to match the required permeate flow value.

Also different from FIG. 1, the feed line 203 includes an adjustable valve 215 downstream from the pump 204. The pump may itself be variable speed or not. In some embodiments, the feedback circuit 211 partially opens or closes the adjustable valve 215 as needed to match the monitored pressure in the concentrate line 207 to the required value received from the feedback circuit 209.

Another feedback circuit 213 adjusts the adjustable value 214 on the concentrate line 207 as needed to maintain the property, such as conductivity, monitored by the permeate sensor 212. Feedback circuit 209, feedback circuit 211, and feedback circuit 213 may each, when adjusting the parameter that the circuit controls, alter the values monitored by one or both of the other two circuits. In this way, the system automatically adjusts the available settings until all values are within required ranges.

Feedback Loops

Figure 3:
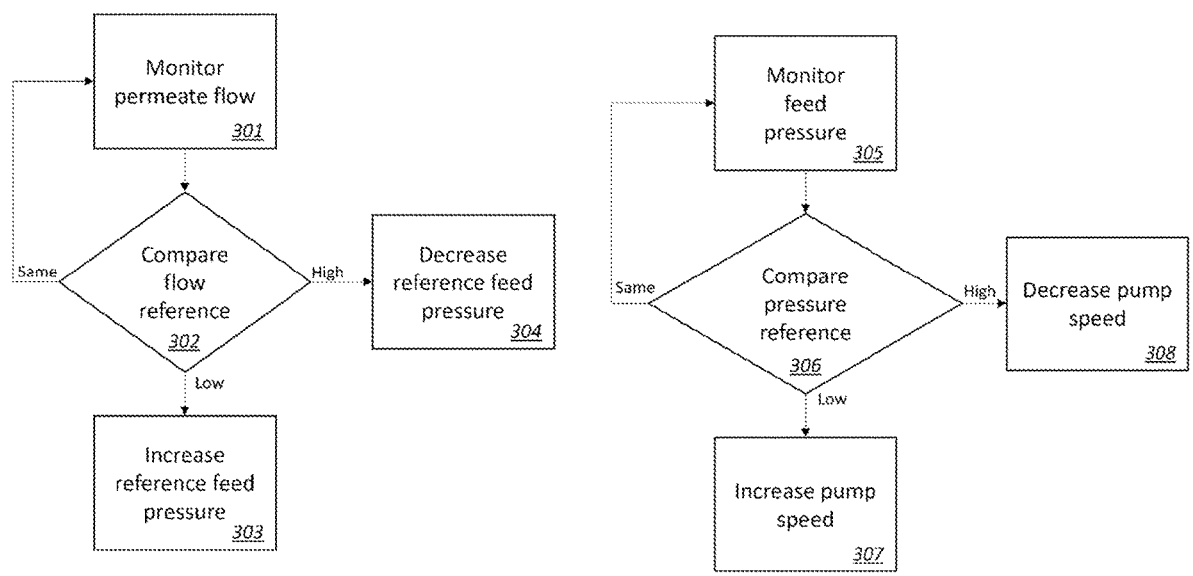
FIG. 3 is a flow chart showing steps for adjusting parameters within a filtration system.

FIG. 3 is a flowchart illustrating a method for feedback control of a system according to embodiments of the present disclosure. At step 301, the system monitors the flow of permeate in the permeate line, with any flow sensor as known in the art. The sensor used in this step may be an intrusive or non-intrusive sensor. In some embodiments, the permeate flow may be measured by means of a pressure sensor, by an optical sensor capable of detecting variations in flow, or by a conventional mechanical flow meter as known in the art. Permeate flow may be measured volumetrically, in terms of mL/s passing through the sensor region, or as an average flow velocity, such as in mm/s.

At step 302, a feedback circuit compares the monitored permeate flow with a reference value for the flow 302. The reference value may, for example, represent a flow capacity for a downstream component receiving the permeate, such as an electrodeionization filter or other device for further processing and filtration of the water. Some systems may include further upstream and downstream processes that may be used to adjust the reference value to keep the permeate flow rate in line with other component rates.

As long as the monitored flow is within the acceptable range given for the reference flow ("same" branch of 302), the feedback circuit continues to monitor the permeate flow. When the permeate flow is measured to drop below the reference flow ("low" branch of 302), the feedback circuit increases the reference pressure (step 303). Similarly, when the permeate flow is measured to rise above the reference flow ("high" branch of 302), the feedback circuit increases the reference pressure (step 304).

The reference pressure set and adjusted in step 303 and step 304 is used by another feedback circuit to carry out its monitoring and adjusting loop. At step 305, the pressure of feed water entering the filter is monitored. This pressure may be in any appropriate units, such as psi, or may be a device-specific measurement without calibrated units. The scale used for pressure is the same as that used to set pressure in step 303 and step 304. At step 306, the feedback sensor compares the monitored feed pressure to the reference pressure, which is set by the other feedback loop as described.

As long as the monitored pressure is within the acceptable range given for the reference pressure ("same" branch of 306), the feedback circuit continues to monitor the feed water pressure. When the feed pressure is measured to drop below the reference pressure ("low" branch of 302), the feedback circuit increases the pump speed (step 307). Similarly, when the feed pressure is measured to rise above the reference pressure ("high" branch of 302), the feedback circuit decreases the pump speed (step 308).

In this manner, the two sets of steps shown in the flowchart of FIG. 3 represent two nested loops that provide for feedback within a single system. Each feedback loop can be set to run independently and/or is as needed, or the loops may be run sequentially. In some embodiments, delays may be included whenever an adjustment is made so as to avoid overcorrection.

Figure 4:
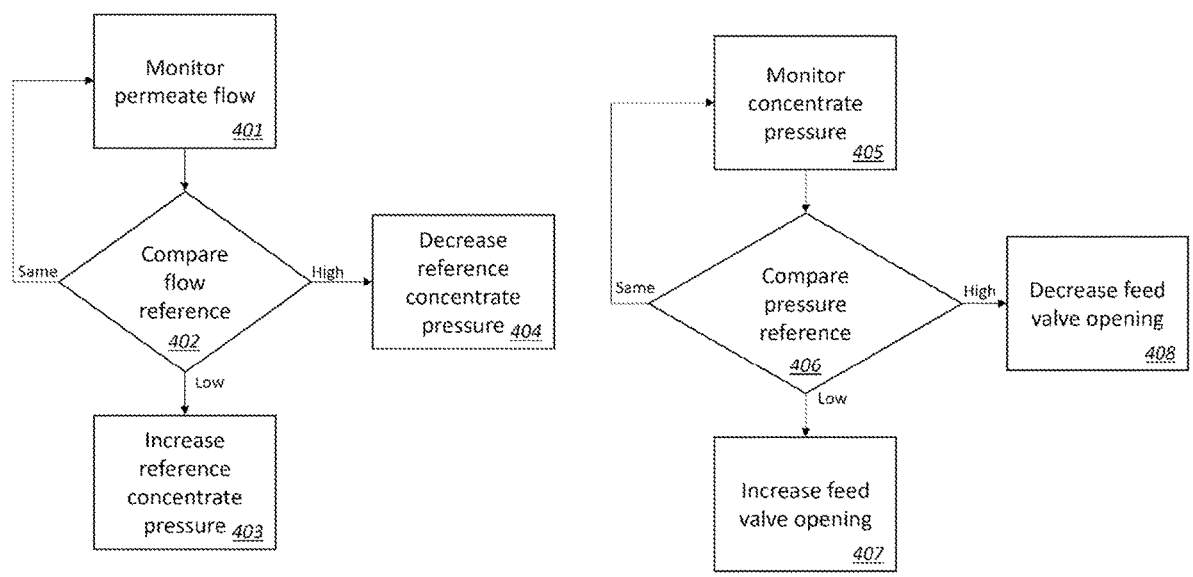
FIG. 4 is a flow chart showing steps for adjusting parameters within a filtration system.

FIG. 4 is a flowchart illustrating a method for feedback control of a system according to embodiments of the present disclosure. At step 401, the system monitors the flow of permeate in the permeate line, with any flow sensor as known in the art. The sensor used in this step may be an intrusive or non-intrusive sensor. In some embodiments, the permeate flow may be measured by means of a pressure sensor, by an optical sensor capable of detecting variations in flow, or by a conventional mechanical flow meter as known in the art. Permeate flow may be measured volumetrically, in terms of mL/s passing through the sensor region, or as an average flow velocity, such as in mm/s.

At step 402, a feedback circuit compares the monitored permeate flow with a reference value for the flow 402. The reference value may, for example, represent a flow capacity for a downstream component receiving the permeate, such as an electrodeionization filter or other device for further processing and filtration of the water. Some systems may include further upstream and downstream processes that may be used to adjust the reference value to keep the permeate flow rate in line with other component rates.

As long as the monitored flow is within the acceptable range given for the reference flow ("same" branch of 402), the feedback circuit continues to monitor the permeate flow. When the permeate flow is measured to drop below the reference flow ("low" branch of 402), the feedback circuit increases the reference pressure (step 403). Similarly, when the permeate flow is measured to rise above the reference flow ("high" branch of 402), the feedback circuit decreases the reference pressure (step 404).

The reference pressure set and adjusted in step 403 and step 404 is used by another feedback circuit to carry out its monitoring and adjusting loop. At step 405, the pressure of concentrate water discharged from the filter is monitored. This pressure may be in any appropriate units, such as psi, or may be a device-specific measurement without calibrated units. The scale used for pressure is the same as that used to set pressure in step 403 and step 404. At step 406, the feedback circuit compares the monitored feed pressure to the reference pressure, which is set by the other feedback loop as described.

As long as the monitored pressure is within the acceptable range given for the reference pressure ("same" branch of 406), the feedback circuit continues to monitor the concentrate water pressure. When the concentrate pressure is measured to drop below the reference pressure ("low" branch of 402), the feedback circuit partially opens the feed valve to increase the size of the feed valve opening (step 407). Similarly, when the feed pressure is measured to rise above the reference pressure ("high" branch of 402), the feedback circuit partially closes the feed valve to decrease the size of the feed valve opening (step 408).

In this manner, the two sets of steps shown in the flowchart of FIG. 4 represent two nested loops that provide for feedback within a single system. Each feedback loop can be set to run independently and/or is as needed, or the loops may be run sequentially. In some embodiments, delays may be included whenever an adjustment is made so as to avoid overcorrection. In other non-limiting embodiments, three nested loops including a third parameter such as conductivity can be configured to provide feedback within a single system.

FIG. 5 shows a flowchart illustrating another method for adjusting control of a filtration system. At step 501, the feedback circuit monitors the conductivity of the permeate water in the permeate line. A conventional conductivity sensor may be used, having been calibrated for the expected values for the unfiltered water source and the end goal of the purification process. The conductivity may be measured, for instance, by applying a known voltage across the permeate line and measuring the current flow.

Conductivity reference values may be determined based on the desired solute concentrations for the water. At step 502, to the feedback circuit compares the monitored conductivity level of the permeate water to the value or range of values that are acceptable. As long as the permeate conductivity remains in the acceptable range ("same" branch of step 502), the monitoring continues. When the conductivity value drops below a minimum value ("low" branch of step 502), the system partially closes the adjustable valve at the concentrate line to decrease the flow rate of the concentrate water. This has the effect of increasing the solute concentration of the water that passes the membrane, which in turn increases the conductivity.

In some embodiments, there is no set minimum value for conductivity. Instead, the system minimizes waste water by periodically decreasing the adjustable valve opening size and relying on the feedback circuits to further adjust if necessary.

When the conductivity value raises above an acceptable maximum ("high" branch of step 502), the feedback circuit responds by partially opening the concentrate water valve, increasing the rate at which water can discharge from the filter as concentrate. This has the effect of reducing the solute concentration in the permeate, which in turn lowers the permeate water's measured conductivity.

While these feedback loops are put forward as largely independent in terms of their electrical communication, it will be understood that components of the system can communicate to each other in order to refine calculations and resolve necessary functions. For example, the feedback circuit responsible for adjusting the pressure rate of the feed line could communicate with the feedback circuit associated with the permeate property sensor, anticipating that the concentration of solute in the permeate would soon increase.

One skilled in the art will understand that various combinations and/or modifications and variations can be made in the described systems and methods depending upon the specific needs for operation. Various aspects disclosed herein may be combined in different combinations than the combinations specifically presented in the description and accompanying drawings. Moreover, features illustrated or described as being part of an aspect of the disclosure may be used in the aspect of the disclosure, either alone or in combination, or follow a preferred arrangement of one or more of the described elements. Depending on the example, certain acts or events of any of the processes or methods described herein may be performed in a different sequence, may be added, merged, or left out altogether (e.g., certain described acts or events may not be necessary to carry out the techniques). In addition, while certain aspects of this disclosure are described as performed by a single module or unit for purposes of clarity, the techniques of this disclosure may be performed by a combination of units or modules associated with, for example, a device.

What is claimed is:

1. A system for water filtration, comprising:
a reverse osmosis filter having a semipermeable membrane;
a feed line, a permeate line, and a concentrate line, each in fluid communication with the filter;
a pump at the feed line pumping feed water into the filter;
a flow sensor configured to monitor a flow rate of permeate water exiting the filter into the permeate line;
a permeate sensor configured to monitor a property of the permeate water;
an adjustable valve configured to regulate a flow rate of concentrate water exiting the filter into the concentrate line; and
a pressure sensor configured to detect a pressure that correlates with permeate water flow; and
at least one controller configured to control:
a first feedback circuit configured to 1) compare the flow rate of the permeate water with a target flow rate of the permeate water and 2) calculate a reference pressure based on a difference between the flow rate of the permeate water and the target flow rate of the permeate water,
wherein the flow rate of the permeate water is based on at least the pressure of the feed line;
a second feedback circuit configured to 1) compare the pressure from the pressure sensor to the reference pressure calculated by the first feedback circuit and 2) regulate a flow rate of the feed water to adjust a pressure of the feed line towards the reference pressure calculated by the first feedback circuit,
wherein the second feedback circuit operates at a higher frequency than at least the first feedback circuit; and
a third feedback circuit configured to regulate the flow rate of the concentrate water exiting the filter into the concentrate line based on the property monitored by the permeate sensor.

2. The system of claim 1, the permeate sensor is a conductivity sensor measuring the conductivity of the permeate water exiting the filter into the permeate line, the conductivity of the permeate water varying according to an amount of solute present in the permeate water after filtration.

3. The system of claim 1, further comprising an adjustable valve at the feed line, the second feedback circuit controlling the adjustable valve at the feed line to adjust the flow rate of the feed water.

4. The system of claim 1, further comprising an electrodeionization filter downstream from the filter.

5. The system of claim 4, wherein the reference pressure is based on one or more predetermined values for the flow rate of the permeate water, which, in turn, are based on a required water flow rate for the electrodeionization filter.

6. The system of claim 4, wherein the reference pressure is based on one or more predetermined values for the property of the permeate water, which, in turn, are based on conditions for operation of the electrodeionization filter.

7. The system of claim 1, the configuration of the first and second feedback circuits interrelated such that the first feedback circuit makes an adjustment based on an adjustment made by the second feedback circuit, and the second feedback circuit makes an adjustment based on the first feedback circuit.

8. The system of claim 1, wherein the pressure sensor configured to detect a pressure that correlates with permeate water flow is located in the feed line.

9. The system of claim 1, wherein the pressure sensor configured to detect a pressure that correlates with permeate water flow is located in the concentrate line.

10. The system of claim 1, wherein the second feedback circuit regulates the flow rate of the feed water to adjust the pressure of the feed line towards the reference pressure calculated by the first feedback circuit by adjusting a speed of the pump.

11. The system of claim 1, wherein the third feedback circuit regulates the flow rate of the concentrate water exiting the filter into the concentrate line by adjusting the adjustable valve configured to regulate the flow rate of concentrate water exiting the filter into the concentrate line.

12. The system of claim 1, wherein the second feedback circuit executes multiple times per second.

13. The system of claim 1, wherein the first feedback circuit executes at a frequency of 0.1 Hz.

14. The system of claim 1, wherein the at least one controller is at least one proportional-integral-derivative controller.

* * * * *